United States Patent [19]

Bayly et al.

[11] Patent Number: 5,948,853
[45] Date of Patent: Sep. 7, 1999

[54] ONE COMPONENT ROOM TEMPERATURE VULCANIZABLE SILICONE SEALANT HAVING AN INCREASED WORK LIFE

[75] Inventors: Brian P. Bayly, Middle Grove; Frederick R. DeCelle, Latham; Van W. Stuart, Clifton Park, all of N.Y.

[73] Assignee: General Electric Company, Waterford, N.Y.

[21] Appl. No.: 08/591,882

[22] Filed: Jan. 26, 1996

[51] Int. Cl.⁶ ...................................................... C08K 3/26
[52] U.S. Cl. .............................. 524/788; 524/863; 528/17
[58] Field of Search ................................... 524/588, 788, 524/863; 528/17

[56] References Cited

U.S. PATENT DOCUMENTS

| | | |
|---|---|---|
| 2,938,009 | 5/1960 | Lucas . |
| 3,004,859 | 10/1961 | Lichtonwainer . |
| 3,635,743 | 1/1972 | Smith . |
| 4,100,129 | 7/1978 | Beers ......................................... 528/14 |
| 4,523,353 | 6/1985 | Hubbard et al. . |
| 4,962,152 | 10/1990 | Leempol .................................. 524/788 |
| 5,112,885 | 5/1992 | Inoue et al. ............................. 523/213 |
| 5,166,243 | 11/1992 | Neale ...................................... 524/266 |
| 5,354,833 | 10/1994 | Dziark . |

FOREIGN PATENT DOCUMENTS

| | | |
|---|---|---|
| 8706884 | 6/1989 | Brazil . |
| 0 544 318 A2 | 6/1993 | European Pat. Off. . |
| 59-0096163 | 2/1984 | Japan . |
| 59-096163 | 6/1984 | Japan . |
| 61-0089281 | 5/1986 | Japan . |
| 030056581 | 3/1991 | Japan . |
| 1539396 | 4/1976 | United Kingdom . |

*Primary Examiner*—Robert Dawson
*Assistant Examiner*—D. Aylward
*Attorney, Agent, or Firm*—Kenneth S. Wheelock; Michelle Bugbee

[57] ABSTRACT

One component room temperature vulcanizable silicone sealant compositions comprising both a specific cross linker, ethyltriacetoxysilane, and a specific extending filler, stearic acid treated calcium carbonate, exhibit an extended work life or tooling time.

15 Claims, No Drawings

ONE COMPONENT ROOM TEMPERATURE VULCANIZABLE SILICONE SEALANT HAVING AN INCREASED WORK LIFE

FIELD OF THE INVENTION

The present invention relates to a one component room temperature vulcanizable silicone sealant having improved work life.

BACKGROUND OF THE INVENTION

Room temperature vulcanizable silicone elastomer compositions are well known in the art. Generally these compositions contain a silanol stopped base polymer or elastomer, reinforcing and/or extending fillers, cross-linking silanes and cure catalysts. Examples are disclosed in U.S. Pat. Nos. 4,100,129 to Beers, 4,523,353 to Lucas and 5,354,833 to Dziark.

One component room temperature vulcanizable silicone that utilize acetoxysilane cross-linkers have short work lives or tooling times. While this is frequently a desirable performance characteristic for many applications, there are applications where it is desirable to have an extended work life or tooling time. Thus depending upon the application the short tooling time of the prior art compositions may be an advantage or a disadvantage.

SUMMARY OF THE INVENTION

The present invention thus provides for a one component room temperature vulcanizable silicone polymer or elastomer, useful as a sealant, containing an acetoxysilane cross-linking compound and a stearic acid treated calcium carbonate filler that has an extended tooling time or work life.

The present invention thus provides for a one component room temperature vulcanizable silicone composition comprising:

(A) a silanol stopped polyorganosiloxane;
(B) stearic acid treated calcium carbonate;
(C) ethyltriacetoxysilane; and
(D) a tin condensation cure catalyst, whereby tooling time is at least 120 seconds.

The present invention also provides for a method for improving the tooling time of a one component room temperature vulcanizable silicone composition, said silicone composition comprising:

(A) a silanol stopped polyorganosiloxane;
(B) stearic acid treated calcium carbonate;
(C) fumed silica;
(D) ethyltriacetoxysilane;
(E) a tin condensation cure catalyst;
(F) a plasticizer;
(G) an adhesion promoter; and
(H) a pigment;

by
(a) controlling the amount of stearic acid treated calcium carbonate to a range between about 12 weight percent and about 20 weight percent; and
(b) controlling the amount of ethyltriaetoxysilane to a range between about 2.00 weight percent and about 7.00 weight percent, whereby tooling time is at least 120 seconds.

DETAILED DESCRIPTION OF THE INVENTION

The present invention provides for a one component room temperature vulcanizable silicone polymer or elastomer composition that has an extended work life or tooling time comprising:

(A) from about 50 to about 100 parts by weight of a silanol stopped polyorganosiloxane having a viscosity ranging from 600 to about 300,000 centipoise (cps), more preferably a viscosity ranging from about 1,000 to 200,000 cps, and most preferably from about 3,000 to about 150,000 cps at 25° C. having the formula HO—$(R^1R^2SiO)_n$—H where $R^1$ and $R^2$ are each independently selected from the group consisting of one to eight carbon atom monovalent hydrocarbon radicals;
(B) from about 5 to about 60 parts by weight of a non-reinforcing or extending filler;
(C) from about 3 to about 25 parts by weight of a reinforcing fumed silica filler;
(D) from about 2 to about 15 parts by weight of a cross-linking acetoxysilane;
(E) from about 0.01 to about 0.4 parts by weight of an organometallic tin condensation cure catalyst; and optional conventional additives such as plasticizers, adhesion promoters, pigments and the like.

The polyorganosiloxane polymer, component (A), of the composition of the present invention is a polymer where the organic substituents of the polymer backbone, $R^1$ and $R^2$, are independently selected from the group of one to eight carbon atom monovalent hydrocarbon radicals including halogenated monovalent radicals such as fluoroalkyl, cycloaliphatic radicals such as cyclohexyl and cyclopentyl, and aromatic radicals such as phenyl and naphthyl. Preferably both $R^1$ and $R^2$ are methyl groups.

The non-reinforcing or extending filler, component (B) must be a stearic acid treated calcium carbonate filler. While from 5 to about 60 parts by weight of the non-reinforcing filler may be used it is preferred to use from about 10 to about 30 parts by weight. The level of stearic acid treatment of the calcium carbonate filler varies from 0.8 to 1.4 weight percent The reinforcing filler, component (C), is a fumed or pyrogenic silica having a surface area in excess of 100 $m^2/gm$. The fumed or pyrogenic silica filler may be treated with cyclic organosiloxanes such as octamethyltetracyclosiloxane, decamethylpentacyclosiloxane and the like or silazanes such as hexamethyldisilazane. Such treated silica fillers are disclosed and taught in U.S. Pat. Nos. 2,938,009 to Lucas, 3,004,859 to Lichtenwalner, and 3,635743 to Smith. While from about 3 to about 25 parts by weight of the reinforcing silica filler may be used it is preferable to use from about 3 to about 20 parts by weight and most preferred to use from about 5 to 15 parts by weight The cross-linking acetoxysilane, component (D) may be present in an amounts ranging from 2 to about 15 parts by weight, more preferably from about 2 to about 10 parts by weight and most preferably from about 4 to about 8 parts by weight The acetoxysilane cross-linker that produces the extended work life or tooling time is ethyltriacetoxysilane.

The organometallic tin condensation cure catalyst, component (E), is a tin carboxylate condensation cure catalyst present in an amount ranging from about 0.01 to about 0.4 parts by weight, preferably from about 0.015 to about 0.3 parts by weight and most preferably from about 0.02 to about 0.25 parts by weight The preferred tin compounds are dibutyl tin dilaurate, dibutyl tin diacetate, dibutyl tin laurate acetate, or mixtures thereof.

A particularly convenient method of preparing the compositions of the present invention is to regard the parts by weight ranges previously recited for each of the components as parts by weight per hundred parts by weight of the total composition.

The composition of the present invention may be further modified by the incorporation of additional components such as plasticizers, adhesion promoters, pigments and the like.

When a plasticizer is used, a trimethylsilyl stopped polydimethylsiloxane having a viscosity ranging from 10 to 50,000 centipoise at 25° C. is preferred, more preferably 10 to 35,000 cps, and most preferably 10 to 20,000 cps.

When adhesion promoters are added to the composition, suitable adhesion promoters include glycidoxypropyltrimethoxysilane, aminoethylaminopropyltrimethoxysilane, methacryloxypropyltrimethoxysilane, vinyltrimethoxysilane, and di-t-butoxydiacetoxysilane. A preferred adhesion promoter is di-t-butoxydiacetoxysilane.

When it is desired to add pigments to the composition suitable pigments include carbon black, titanium dioxide, red iron oxide, flaked aluminum and the like.

By virtue of providing a composition with increased tooling time, a method of controlling tooling time is thus developed. Within the composition parameters already set forth by controlling the quantity of stearic acid treated calcium carbonate in the formulation to between 12 and 20 weight percent and controlling the amount of ethyltriacetoxysilane cross linker to between 3.00 and 7.00 weight percent, the tooling time may be controlled. This is important for one component room temperature vulcanizable silicone compositions because one of the reagents participating in the cure reaction is atmospheric moisture or humidity. This is in contrast to two component compositions where the cure begins upon mixing of the two components, but the components are kept separated until it is desired to produce a curing composition. One component room temperature vulcanizable silicone compositions, in contrast, must rely on other means of controlling when the cure is initiated because the moment the composition is removed from storage and exposed to the atmosphere the curing reaction begins to take place. Thus, by choosing a particular extending filler, stearic acid treated calcium carbonate and a specific cross linking agent, ethyltriacetoxysilane, the work life or tooling time may be controlled because the curing reaction has been slowed down by these particular choices.

All United States patents referenced herein are herewith and hereby specifically incorporated by reference.

EXAMPLES

Tooling Time or Work Life Test

A large bead of test sealant (silicone polymer or elastomer) was extruded from its container and leveled off to a thickness of 1/16 inch thick, with a width of 3 inches and a length of 4 inches. A wooden spatula was inserted into the sealant panel just below the surface and dragged across the width of the sealant, at 60 second intervals, beginning one minute after the sealant was leveled off. The work life or tooling time is defined as the length of time elapsed before ripples or other deformations were left in the path made by the wooden spatula.

Example 1

Preparation of a one component silicone sealant having the following composition:

(A) 53 parts by weight of a silanol stopped polydimethylsiloxane having a viscosity of 30,000 centipoise (cps) at 25° C.;

(B) 20 parts by weight of a stearic acid treated calcium carbonate filler;

(C) 10 parts by weight of a cyclic polydimethylsiloxane treated fumed silica filler;

(D) 4.8 parts by weight of ethyltriacetoxysilane cross-linker;

(E) 0.0257 parts by weight of dibutyl tin dilaurate tin condensation cure catalyst;

(F) 10 parts by weight of a linear trimethyl stopped polydimethylsiloxane plasticizing fluid;

(G) 1.17 parts by weight of di-t-butoxydiacetoxysilane adhesion promoter; and (H) 1 part by weight of carbon black pigment.

The tooling time determined for this composition was 350 seconds.

Example 2

Preparation of a one component room temperature vulcanizable silicone having the following composition:

(A) 53 parts by weight of a silanol stopped polydimethylsiloxane having a viscosity of 30,000 centipoise (cps) at 25° C.;

(B) 20 parts by weight of a stearic acid treated calcium carbonate filler;

(C) 10 parts by weight of a cyclic polydimethylsiloxane treated fumed silica filler;

(D) 4.8 parts by weight of methyltriacetoxysilane cross-linker;

(E) 0.0257 parts by weight of dibutyl tin dilaurate tin condensation cure catalyst;

(F) 10 parts by weight of a linear trimethyl stopped polydimethylsiloxane plasticizing fluid;

(G) 1.17 parts by weight of di-t-butoxydiacetoxysilane adhesion promoter; and (H) 1 part by weight of carbon black pigment.

The tooling time determined for the composition described in example 2 was 120 seconds.

Example 3

Example 3 describes a one component room temperature vulcanizable silicone polymer having the following composition:

(A) 65 parts by weight of a silanol stopped polydimethylsiloxane having a viscosity of 30,000 centipoise (cps) at 25° C.;

(B) 0 parts by weight of a stearic acid treated calcium carbonate filler;

(C) 18 parts by weight of a cyclic polydimethylsiloxane treated fumed silica filler;

(D) 4.8 parts by weight of ethyltriacetoxysilane cross-linker;

(E) 0.0257 parts by weight of dibutyl tin dilaurate tin condensation cure catalyst;

(F) 10 parts by weight of a linear trimethyl stopped polydimethylsiloxane plasticizing fluid;

(G) 1.17 parts by weight of di-t-butoxydiacetoxysilane adhesion promoter; and (H) 1 part by weight of carbon black pigment.

The tooling time determined for the composition in example 3 was 60 seconds.

Example 4

Example 4 describes the preparation of a room temperature vulcanizable silicone having the following composition:

(A) 65 parts by weight of a silanol stopped polydimethylsiloxane having a viscosity of 30,000 centipoise (cps) at 25° C.;

(B) 0 parts by weight of a stearic acid treated calcium carbonate filler;

(C) 18 parts by weight of a cyclic polydimethylsiloxane treated fumed silica filler;

(D) 4.8 parts by weight of methyltriacetoxysilane crosslinker;

(E) 0.0257 parts by weight of dibutyl tin dilaurate tin condensation cure catalyst;

(F) 10 parts by weight of a linear trimethyl stopped polydimethylsiloxane plasticizing fluid;

(G) 1.17 parts by weight of di-t-butoxydiacetoxysilane adhesion promoter; and (H) 1 part by weight of carbon black pigment.

The tooling time determined for the composition described in example 4 was 60 seconds.

Example 5

Preparation of a one component silicone sealant having the following composition:

(A) 58 parts by weight of a silanol stopped polydimethylsiloxane having a viscosity of 30,000 centipoise (cps) at 25° C.;

(B) 15 parts by weight of a stearic acid treated calcium carbonate filler;

(C) 10 parts by weight of a cyclic polydimethylsiloxane treated fumed silica filler;

(D) 4.8 parts by weight of ethyltriacetoxysilane crosslinker;

(E) 0.0257 parts by weight of dibutyl tin dilaurate tin condensation cure catalyst;

(F) 10 parts by weight of a linear trimethyl stopped polydimethylsiloxane plasticizing fluid;

(G) 1.17 parts by weight of di-t-butoxydiacetoxysilane adhesion promoter; and (H) 1 part by weight of carbon black pigment.

The tooling time determined for this composition was 180 seconds.

Example 6

Preparation of a one component silicone sealant having the following composition:

(A) 61 parts by weight of a silanol stopped polydimethylsiloxane having a viscosity of 30,000 centipoise (cps) at 25° C.;

(B) 10 parts by weight of a stearic acid treated calcium carbonate filler;

(C) 12 parts by weight of a cyclic polydimethylsiloxane treated fumed silica filler;

(D) 4.8 parts by weight of ethyltriacetoxysilane crosslinker;

(E) 0.0257 parts by weight of dibutyl tin dilaurate tin condensation cure catalyst;

(F) 10 parts by weight of a linear trimethyl stopped polydimethylsiloxane plasticizing fluid;

(G) 1.17 parts by weight of di-t-butoxydiacetoxysilane adhesion promoter; and (H) 1 part by weight of carbon black pigment.

The tooling time determined for this composition was 90 seconds.

Based on a comparison of Examples 1, 5, and 6 in order to obtain a tooling time of 120 seconds or greater and assuming a quadratic relationship between stearic acid treated calcium carbonate level and tooling time, a level of about 12 parts by weight per hundred parts of the total composition of treated calcium carbonate is necessary for a tooling time or work life of 120 seconds. Based on the experimental results a treated calcium carbonate level of about 15 parts by weight per hundred parts of the total composition is necessary for a tooling time of 180 seconds. The weight percent comparisons are tabulated in Table 1.

Example 7

Preparation of a one component silicone sealant having the following composition:

(A) 53 parts by weight of a silanol stopped polydimethylsiloxane having a viscosity of 30,000 centipoise (cps) at 25° C.;

(B) 20 parts by weight of a stearic acid treated calcium carbonate filler;

(C) 10 parts by weight of a cyclic polydimethylsiloxane treated fumed silica filler;

(D) 4.59 parts by weight of ethyltriacetoxysilane crosslinker;

(E) 0.0304 parts by weight of dibutyl tin dilaurate tin condensation cure catalyst;

(F) 10 parts by weight of a linear trimethyl stopped polydimethylsiloxane plasticizing fluid;

(G) 1.383 parts by weight of di-t-butoxydiacetoxysilane adhesion promoter; and (H) 1 part by weight of carbon black pigment.

The tooling time determined for this composition was 300 seconds.

Example 8

Preparation of a one component silicone sealant having the following composition:

(A) 53 parts by weight of a silanol stopped polydimethylsiloxane having a viscosity of 30,000 centipoise (cps) at 25° C.;

(B) 20 parts by weight of a stearic acid treated calcium carbonate filler;

(C) 10 parts by weight of a cyclic polydimethylsiloxane treated fumed silica filler;

(D) 4.961 parts by weight of ethyltriacetoxysilane crosslinker;

(E) 0.0222 parts by weight of dibutyl tin dilaurate tin condensation cure catalyst;

(F) 10 parts by weight of a linear trimethyl stopped polydimethylsiloxane plasticizing fluid;

(G) 1.017 parts by weight of di-t-butoxydiacetoxysilane adhesion promoter; and (H) 1 part by weight of carbon black pigment.

The tooling time determined for this composition was 300 seconds.

Example 9

Preparation of a one component silicone sealant having the following composition:

(A) 54.02 parts by weight of a silanol stopped polydimethylsiloxane having a viscosity of 30,000 centipoise (cps) at 25° C.;

(B) 20.37 parts by weight of a stearic acid treated calcium carbonate filler;

(C) 10.197 parts by weight of a cyclic polydimethylsiloxane treated fumed silica filler;

(D) 3.00 parts by weight of ethyltriacetoxysilane crosslinker;

(E) 0.0257 parts by weight of dibutyl tin dilaurate tin condensation cure catalyst;

(F) 10.20 parts by weight of a linear trimethyl stopped polydimethylsiloxane plasticizing fluid;

(G) 1.17 parts by weight of di-t-butoxydiacetoxysilane adhesion promoter; and (H) 1.02 part by weight of carbon black pigment.

The tooling time determined for this composition was 300 seconds.

Example 10

Preparation of a one component silicone sealant having the following composition:

(A) 51.36 parts by weight of a silanol stopped polydimethylsiloxane having a viscosity of 30,000 centipoise (cps) at 25° C.;

(B) 19.74 parts by weight of a stearic acid treated calcium carbonate filler;

(C) 9.691 parts by weight of a cyclic polydimethylsiloxane treated fumed silica filler;

(D) 7.00 parts by weight of ethyltriacetoxysilane crosslinker;

(E) 0.0257 parts by weight of dibutyl tin dilaurate tin condensation cure catalyst;

(F) 9.697 parts by weight of a linear trimethyl stopped polydimethylsiloxane plasticizing fluid;

(G) 1.17 parts by weight of di-t-butoxydiacetoxysilane adhesion promoter; and (H) 0.9691 part by weight of carbon black pigment.

The tooling time determined for this composition was 300 seconds.

Examples 1, 2, 3, and 4 demonstrate that extended tooling times may be achieved by the simultaneous use of ethyltriacetoxysilane and stearic acid treated calcium carbonate.

Examples 1, 5, and 6 demonstrate the ranges of treated calcium carbonate wherein tooling times or work life in excess of 120 or 180 seconds may be achieved. This data is summarized in table 1

TABLE 1

Treated Calcium Carbonate Level Affects Tooling Time

| Component weight percent | Ex. 1 | Ex. 5 | Ex. 6 |
|---|---|---|---|
| Base polymer (A) | 53.00 | 58.00 | 61.00 |
| CaCO$_3$ | 20.00 | 15.00 | 10.00 |
| SiO$_2$ | 10.00 | 10.00 | 12.00 |
| Cross-Linker (ethyltriacetoxysilane) | 4.80 | 4.80 | 4.80 |
| Catalyst | 0.0257 | 0.0257 | 0.0257 |
| Plasticizer | 10.00 | 10.00 | 10.00 |
| Adhesion Promoter | 1.17 | 1.17 | 1.17 |
| Pigment (carbon black) | 1.00 | 1.00 | 1.00 |
| Tooling Time (sec) | 350 | 180 | 90 |

Note to Table: Due to rounding errors some of the compositions may not add precisely to 100 parts by weight.

A work life or tooling time of 120 seconds requires a minimum of about 12 weight percent treated calcium carbonate at a cross-linker level of 4.79 weight percent ethyltriacetoxysilane. Tooling time increases to 180 seconds when the calcium carbonate level is increased to about 15 weight percent.

TABLE 2

Cross Linker Level Only Moderately Affects Tooling Time

| Component weight percent | Ex. 1 | Ex. 7 | Ex. 8 | Ex. 9 | Ex. 10 |
|---|---|---|---|---|---|
| Base polymer (A) | 53.00 | 53.00 | 53.00 | 54.02 | 51.36 |
| CaCO$_3$ | 20.00 | 20.00 | 20.00 | 20.37 | 19.74 |
| SiO$_2$ | 10.00 | 10.00 | 10.00 | 10.197 | 9.691 |
| Cross-Linker (ethyltriacetoxysilane) | 4.80 | 4.59 | 4.96 | 3.00 | 7.00 |
| Catalyst | 0.0257 | 0.0304 | 0.0222 | 0.0257 | 0.0257 |
| Plasticizer | 10.00 | 10.00 | 10.00 | 10.20 | 9.697 |
| Adhesion Promoter | 1.17 | 1.383 | 1.017 | 1.17 | 1.17 |
| Pigment (carbon black) | 1.00 | 1.00 | 1.00 | 1.02 | 0.9691 |
| Tooling Time (sec) | 350 | 300 | 300 | 300 | 300 |

Note to Table: Due to rounding errors some of the compositions may not add precisely to 100 parts by weight.

Assuming that the small variations in the levels of adhesion promoter and catalyst have no effect on tooling time or work life, at constant levels of treated calcium carbonate, a variation of between +31.43 and −37.50 percent in the level of cross linker reduces the tooling time by no more than about 14 percent. This is contrasted against a 25% reduction in the calcium carbonate level which produces almost a 50% reduction in tooling time (20 wt. % and 350 seconds vs. 15 wt. % and 180 seconds), and a 50% reduction in calcium carbonate producing almost a 75% reduction in tooling time (20 wt. % and 350 seconds vs. 10 wt. % and 90 seconds). While both effects are not linear, the variation in treated calcium carbonate level produces a greater change.

We claim:

1. A one component room temperature vulcanizable silicone composition comprising
   (A) a silanol stopped polyorganosiloxane;
   (B) stearic acid treated calcium carbonate;
   (C) ethyltriacetoxysilane; and
   (D) a tin condensation cure catalyst, whereby tooling time of said room temperature vulcanizable silicone composition is at least 120 seconds.

2. The composition of claim 1 wherein tooling time is at least 180 seconds.

3. The composition of claim 1 wherein tooling time is at least 300 seconds.

4. A one component room temperature vulcanizable silicone composition comprising
   (A) from about 50 to 100 parts by weight of a silanol stopped polydimethylsiloxane of the formula HO—(R$^1$R$^2$SiO)$_n$—H having a viscosity ranging from about 600 to about 300,000 centipoise where R$^1$ and R$^2$ are each independently selected from the group consisting of one to eight carbon atom monovalent hydrocarbon radicals;
   (B) from about 5 to about 60 parts by weight of calcium carbonate treated with stearic acid wherein the level of stearic acid ranges from about 0.8 to 1.4 weight percent of said calcium carbonate treated with stearic acid;
   (C) from about 2 to about 15 parts by weight of ethyltriacetoxysilane; and
   (D) from about 0.01 to about 0.4 parts by weight of an organometallic tin condensation cure catalyst selected from the group consisting of dibutyl tin dilaurate, dibutyl tin diacetate, dibutyl tin laurate acetate, and mixtures thereof; where the total weight of (A), (B), and (C) ranges from about 57 parts by weight to about 175 parts by weight.

5. The composition of claim 4 wherein the tooling time is at least 180 seconds.

6. The composition of claim 4 wherein the tooling time is at least 300 seconds.

7. A one component room temperature vulcanizable silicone composition consisting essentially of
   (A) at least 53 weight percent of a silanol stopped polyorganosiloxane;
   (B) at least 12 weight percent of a stearic acid treated calcium carbonate wherein the level of stearic acid ranges from about 0.8 to 1.4 weight percent of said calcium carbonate treated with stearic acid; and
   (C) at least 2.00 weight percent of ethyltriacetoxysilane;
   (D) at least 0.001 weight percent of a tin condensation cure catalyst selected from the group consisting of dibutyl tin dilaurate, dibutyl tin diacetate, dibutyl tin laurate acetate, or mixtures thereof.

8. The composition of claim 7 wherein the tooling time is at least 180 seconds.

9. The composition of claim 7 wherein the tooling time is at least 300 seconds.

10. The composition of claim 8 wherein the amount of stearic acid treated calcium carbonate ranges from about 12 weight percent to about 20 weight percent of said room temperature vulcanizable silicone composition.

11. The composition of claim 10 wherein the amount of ethyltriacetoxysilane ranges from about 2.00 to about 8.00 weight percent in said one component room temperature vulcanizable silicone composition.

12. A method for improving the tooling time of a one component room temperature vulcanizable silicone composition, said silicone composition comprising:
    (A) a silanol stopped polyorganosiloxane;
    (B) stearic acid treated calcium carbonate;
    (C) fumed silica;
    (D) ethyltriacetoxysilane;
    (E) a tin condensation cure catalyst;
    (F) a plasticizer;
    (G) an adhesion promoter; and
    (H) a pigment;
    by
    (a) controlling the amount of stearic acid treated calcium carbonate in said one component room temperature vulcanizable silicone composition to a range between about 12 weight percent and about 20 weight percent; and
    (b) controlling the amount of ethyltriacetoxysilane in said one component room temperature vulcanizable silicone composition to a range between about 2.00 weight percent and about 8.00 weight percent.

13. The method of claim 12 wherein the calcium carbonate in said one component room temperature vulcanizable silicone composition is in a range of from about 15 weight percent to about 20 weight percent of said room temperature vulcanizable silicone composition.

14. The method of claim 12 wherein the calcium carbonate in said one component room temperature vulcanizable silicone composition is at a level of about 20 weight percent of said room temperature vulcanizable silicone compositions.

15. The method of claim 14 wherein the ethyltriacetoxysilane in said one component room temperature vulcanizable silicone composition is at a level of about 4.8 weight percent of said room temperature vulcanizable silicone composition.

* * * * *